United States Patent
Wendel et al.

(10) Patent No.: US 7,532,216 B2
(45) Date of Patent: May 12, 2009

(54) METHOD OF SCALING A GRAPHIC CHARACTER

(75) Inventors: Dirk Wendel, Grasbrunn (DE); Ulrich Langenkamp, Neubiberg (DE); Marko Hahn, Neubiberg (DE)

(73) Assignee: Micronas GmbH, Freiburg (DE)

( * ) Notice: Subject to any disclaimer, the term of this patent is extended or adjusted under 35 U.S.C. 154(b) by 0 days.

(21) Appl. No.: 11/297,123

(22) Filed: Dec. 7, 2005

(65) Prior Publication Data
US 2006/0119624 A1 Jun. 8, 2006

(30) Foreign Application Priority Data
Dec. 7, 2004 (DE) .................. 10 2004 058 937

(51) Int. Cl.
G06T 11/00 (2006.01)
G09G 5/26 (2006.01)
G09G 5/00 (2006.01)

(52) U.S. Cl. .................. 345/472; 345/619; 345/660; 345/668; 345/669; 345/467; 345/472.2

(58) Field of Classification Search ......... 345/467–469, 345/619, 660, 668, 669, 472, 472.2; 382/177, 382/298; 348/445, 448, 581
See application file for complete search history.

(56) References Cited

U.S. PATENT DOCUMENTS

| | | | |
|---|---|---|---|
| 5,170,442 A | 12/1992 | Murai et al. | 382/47 |
| 5,241,653 A | 8/1993 | Collins et al. | 395/139 |
| 5,461,707 A | 10/1995 | O'Gorman | |
| 6,072,462 A * | 6/2000 | Movshovich | 345/467 |
| 6,157,389 A | 12/2000 | Knowlton | |
| 6,281,876 B1 * | 8/2001 | Jones, Jr. | 345/467 |
| 6,392,650 B1 * | 5/2002 | Morrish et al. | 345/472 |
| 6,515,667 B1 | 2/2003 | Haneda et al. | 345/472 |
| 6,606,094 B1 * | 8/2003 | Jones, Jr. | 345/467 |
| 2002/0149588 A1 * | 10/2002 | Babcock | 345/468 |
| 2005/0035969 A1 * | 2/2005 | Hoeck et al. | 345/467 |

OTHER PUBLICATIONS

Casey et al., "Automatic Scaling of Digital Print Fonts," IBM Journal of Research and Development, vol. 26, No. 6, Nov. 1982.

* cited by examiner

Primary Examiner—Chante Harrison
(74) Attorney, Agent, or Firm—O'Shea Getz P.C.

(57) ABSTRACT

A graphic character that has a character matrix with a number of character units that are indivisible at least in either a horizontal direction or a vertical direction is scaled by dividing the character matrix into one first and at least one second character segment, each comprising at least one of the character units. The first character segment is symmetrically scaled using a first scaling factor and the second character segment is scaled using a second scaling factor different from the first scaling factor.

19 Claims, 3 Drawing Sheets

FIG 4

| Name | Resolution | S | S1 | S2 |
|---|---|---|---|---|
| VGA | 640x480 | 1,9 | 2 | 1,5 |
| WVGA | 848x480 | 1,9 | 2 | 1,5 |
| WXGA 1 | 1280x720 | 2,8 | 3 | 2 |
| UXGA | 1600x1200 | 4,8 | 5 | 4 |
| WUXGA | 1920x1200 | 4,8 | 5 | 4 |

METHOD OF SCALING A GRAPHIC CHARACTER

PRIORITY INFORMATION

This patent application claims priority from German patent application 10 2004 058 937.2 filed Dec. 7, 2004, which is hereby incorporated by reference.

BACKGROUND OF THE INVENTION

The present invention relates to the field of television signal processing, and in particular to a method of scaling an alphanumeric character, such as a teletext character.

In order to display information on a matrix-like-constructed display device (e.g., a display screen) a known technique is to employ characters that are constructed in a matrix-like manner. An example of such characters involves teletext characters that function to display teletext information transmitted during the blanking interval in television transmission. These teletext characters comprise, irrespective of the language in which the text display is implemented, the characters that are required to display the textual and numerical information on the display device, (i.e., the numerical characters of the specific language and the letters of the specific alphabet).

For teletext display in Europe, the individual teletext characters comprise a pixel matrix of 10×12 pixels (i.e., a matrix of 10 pixel lines and 12 pixel columns). The lines and columns represent the specific character units that cannot be further divided in the direction of the line or in the direction of the column. A teletext character of this type is illustrated in FIG. 1 for a character representing the letter "A."

A standard teletext page comprises 25 lines of 56 characters each of the type shown in FIG. 1, such that a display device having 250 pixel lines and 672 pixel columns (250× 672=25·10×56·12) is required to display this teletext page. Modern displays such as for example LCD displays, plasma displays, or Digital Light Processing (DLP) displays have resolutions that far exceed the resolution required to display a teletext page. Display of a teletext page on such a display device necessitates scaling of the individual characters in order to enable the teletext page to at least approximately fill out the available image raster.

This type of scaling using a scaling factor greater than one is comparatively easy to implement if the goal is scaling using an integer scaling factor. If, for example, instead of 250 lines there are (k·250) lines available for the display, where k is an integer, then it is sufficient simply to repeat k times the individual lines of the teletext characters for the teletext page, (i.e, to reproduce it in k successive lines of the image). A corresponding integer scaling can be achieved in the column direction by repeated reproduction of the individual columns of the columns forming the teletext page. Scaling in the case of non-integer scaling factors is more difficult, as is explained below based on an example:

On LCD, plasma, and DLP display devices, the resolutions commonly found are in the so-called WXGA format comprising 1280 image columns and 720 image lines (1280× 720). To achieve "line-filling" display of a teletext character on this type of display device, scaling in the line direction is required using a non-integer scaling factor of 2.88 (=720/ 250). A compromise might be to round down the scaling factor to the next-lowest integer value of two (2), which measure would result in incomplete utilization of the available display area; 220 (=720−2·250) out of the total of 720 lines remain unused. Rounding up the scaling factor to the next-highest integer would result in one or a few lines not being displayed at the upper or lower margins of the teletext image, which is also unacceptable.

Another known approach for scaling individual characters by a non-integer scaling factor is to scale the individual lines differently based on a predetermined scheme. For example, an overall scaling factor of 2.8 can be achieved by scaling every fifth line by a scaling factor of two, while scaling the remaining lines by a scaling factor of three (3). However, this type of approach can result in asymmetries in the enlarged characters.

If the goal is to scale a character using a scaling factor less than one, then certain pixel lines or pixel columns must be deleted as a function of the scaling direction. This deletion of lines or columns is perceived by a viewer as being less objectionable if lines or columns of the character are deleted that are spaced at regular intervals, or if after deletion only those lines or columns of the original image remain which are spaced at regular intervals.

There is a need for a technique for scaling a character which comprises a number of character units that are indivisible in at least either a horizontal direction or a vertical direction wherein asymmetries in the display of the scaled character are avoided.

SUMMARY OF THE INVENTION

A graphic character that has a character matrix with a number of character units that are indivisible at least in either a horizontal direction or a vertical direction is scaled by dividing the character matrix into one first and at least one second character segment, each comprising at least one of the character units. The first character segment is symmetrically scaled using a first scaling factor and the second character segment is scaled using a second scaling factor different from the first scaling factor.

In the following, "character units" are understood to mean lines of a character matrix when scaling of the character in the line direction is to be effected, whereas "character units" are understood to mean columns of the character matrix when scaling of the character in the column direction is to be effected.

It is of course possible to scale a character in the line direction and to scale it independently thereof in the column direction. During a line scaling the character matrix is divided first line-wise into at least two segments, while during a column scaling the matrix is divided column-wise into at least two segments.

Scaling is either an increase in the number of character units of the given character segment, or a decrease in the number of character units of the given character unit. Scaling using a scaling factor greater than one may be achieved by repeating the given character units according to the value of the scaling factor. Scaling using a scaling factor less than one (but greater than zero) may be achieved by deleting individual character units.

A symmetrical scaling of the first character segment using a first scaling factor greater than one means that all the character units of the first segment are displayed repeatedly adjacently, the first scaling factor being an integer. A symmetrical scaling of the first character segment using a scaling factor less than one here means that the first character segment is divided into at least two subsegments, each having the same number of character units, while the same number of character units is deleted from each character segment at the same respective positions of the subsegment.

The scaling factors for the first segment and the at least one second segment are always matched to each other such that, when viewing the entire character, a scaling is achieved having the desired scaling factor (i.e., that the number of character units of the scaled character corresponds to the product of the number of character units of the character to be scaled and the scaling factor).

The technique exploits the knowledge that the character matrix of graphic characters frequently has an information segment containing character information as well as a blank segment containing no character information. "Blank segments" mean blank lines if the character units are lines, and blank columns when the character units are columns. The blank segments separate the pixel pattern of the given character visually from an adjacent character to be displayed on the display device.

For these characters, the information segment contains the pixel pattern which characterizes the individual characters, whereas the blank segment does not contain any character information, or at most less relevant character information, or character information which occurs only for a few graphic characters of a graphic character set. Examples of less relevant or seldom-occurring character information include accent characters, apostrophe characters, Umlaut character dots, et cetera.

For characters having a blank segment, the first character segment is selected so that it corresponds to the information segment, while the second character segment is selected so that it corresponds to the blank segment. The character is divided into two character segments that are scaled differently. The scaling factors for the two character segments can be selected such that at least the information segment is scaled symmetrically, with the result that no asymmetries occur when displaying the pixel pattern characterizing the character. The fact that the at least one second character segment is scaled using a second scaling factor differing from the first scaling factor is visually difficult to perceive, if this second segment is a blank segment which contains no information and serves only as a "placeholder" relative to adjacent characters to be displayed on the display device, or which is utilized only in the case of a few characters for character information (e.g., for example, accents, Umlauts, ascenders or descenders). Scaling of this character information, which is usually visually set off from the rest of the characters using a different scaling factor than the part of the character in the first character segment, usually is visually hardly perceptible.

The character matrix is preferably divided into two second character segments, where the first character segment is located between the second character segments. These two second character segments can be scaled using a common second scaling factor, or they can be scaled using different scaling factors. In particular, it is possible to select the second character segments such that they each comprise only one character unit (e.g., one line or one column). The character may be a teletext character having a character matrix of 12 columns and 10 lines.

These and other objects, features and advantages of the present invention will become more apparent in light of the following detailed description of preferred embodiments thereof, as illustrated in the accompanying drawings.

BRIEF DESCRIPTION OF THE DRAWINGS

FIG. 4 contains in table form a compilation of first and second scaling factors for various display devices.

DETAILED DESCRIPTION OF THE INVENTION

The invention is first explained for the case in which scaling of a character is to be achieved using a non-integer scaling factor greater than one.

Figure 1:
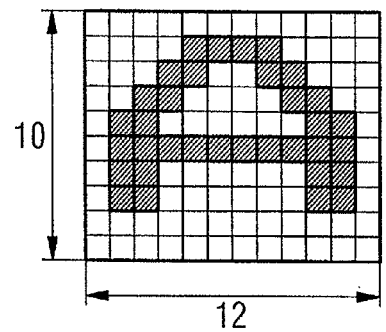
FIG. 1 illustrates a pixel-like structure of a teletext character based on the character for the letter "A"
Figure 2:
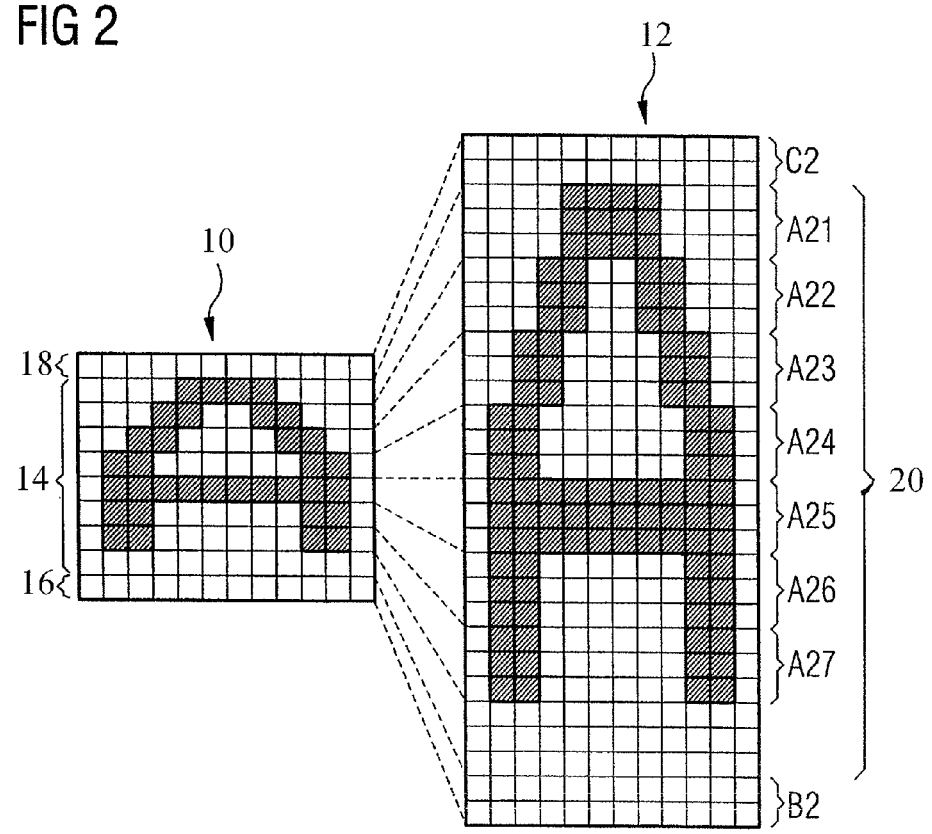
FIG. 2 illustrates a scaling of the teletext character "A" using a non-integer scaling factor in the line direction.

FIG. 2 shows on the left a character 10 to be scaled, which comprises a pixel matrix with m lines of n pixels each. In the example, the character shown corresponds to the teletext character for the letter "A" which comprises ten lines (i.e., m=10) and twelve pixels per line (i.e., n=12). The goal is to scale this character in the line direction using a non-integer scaling factor value S to obtain a scaled character 12 which comprises a pixel matrix of (S·m) lines of n pixels each. This type of scaling in which the number of lines of the pixel matrix is increased is hereinafter called line scaling.

To scale in the line direction the displayed teletext character 10 comprising an (m×n) pixel matrix, the character matrix is divided into a first character segment 14 and at least one second character segment 16, 18, where each of these character segments 14, 16, 18 comprises at least one line of the pixel matrix. The lines of the pixel matrix form character units that cannot be further divided in the vertical direction of the pixel matrix. In the embodiment shown, the character 10 is divided into three character segments, specifically the first segment 14 and two second character segments 16, 18. The first character segment 14 forms an information segment of the character that comprises the pixel pattern characterizing the character (in the example shown a black-and-white pattern having black and white pixels). The second character segments 16, 18 form blank segments or blank lines, where one of these blank lines 16 completes the pixel matrix in the vertical direction at the bottom while the other of these blank lines 18 completes the pixel matrix in the vertical direction at the top.

In order to scale the character 10, the first segment 14 is scaled symmetrically by a first integer scaling factor by displaying the lines of this first segment 14 repeatedly adjacently according to the value of this scaling factor. The scaling may also comprise filtering. This filtering may be designed so that block-like or step-like structures are "smoothed" in the scaled character.

In the embodiment shown in FIG. 2, this scaling factor is S1 equal to three (i.e., S1=3). The lines of this first character segment 14 are thus each displayed three times in succession to obtain a scaled first character segment 20 of the scaled character 12.

The result of the symmetrical scaling of all the lines of the first character segment 14 by the first integer scaling factor S1 is that the image pattern present in the first character segment 20 of the scaled character 12 has no asymmetries relative to the image pattern of the character 10 to be scaled. In order to achieve an overall scaling of the character 10 using a non-integer scaling factor, the second character segments 16, 18 are scaled by a second scaling factor S2, which must be different from the first scaling factor S1 and does not necessarily have to be an integer.

In the example shown, the second scaling factor by which character segments 16, 18 are scaled is S2 equal to two (i.e., S2=2). When the scaled character is viewed, the different scaling for the first and second character segments 14, 16, 18 is visually imperceptible since the second character segments 16, 18 are selected so that they are blank segments (i.e., do not contain any character information). When displaying multiple characters vertically adjacent or horizontally adjacent on a display device, these blank lines visually separate the individual characters from each other. For the viewer, scaling of these separative segments 16, 18 using the scaling factor S2, which is different from the scaling factor S1, is virtually imperceptible, in contrast to when different scaling factors are employed within the segment 14 containing the character information. In particular, the two blank segments 16, 18 may be scaled using different scaling factors as necessary.

If a non-integer scaling factor is used to scale the blank segments, then the number of lines of the given blank segment is multiplied by the scaling factor to obtain the number of lines of the scaled blank segment. The number of lines of the scaled blank segment is rounded down as needed to the next integer value when the multiplication result provides a non-integer value.

In the example shown, scaling of the teletext character "A" comprising ten (10) pixel lines is effected such that a scaled teletext character is generated having twenty-eight (28) pixel lines. These twenty-eight pixel lines result from scaling the first segment 14 comprising the eight lines by the scaling factor S1 equal to three (i.e., S1=3), and from scaling the second segments 16, 18, each comprising one line, by a second scaling of two (i.e., S2=2). The scaling factor in this case is thus S=N2/N1=2.8 and is a non-integer.

The scaling of a teletext character as explained based on FIG. 2 is capable, for example, of scaling teletext characters such that a teletext image having twenty-five (25) lines of fifty-six (56) characters each can be displayed "in a line-filling manner" on a display device having a WXGA resolution of 720 pixel lines of 1280 pixels each. Of the 720 pixel lines in the case of an employed line scaling factor of 2.8, 700 (i.e., 25×28) pixel lines are utilized.

The scaling technique is also capable of scaling the character in the column direction, where, in the scaling of teletext characters, use is also made of the fact that the pixel matrix of teletext characters is delimited horizontally on both sides of a blank column. These blank columns can be scaled by a scaling factor different from the segment delimited by these blank columns, which segment comprises the pixel information of the character, when the purpose is to achieve an overall non-integer scaling factor.

The scaling factor of blank lines 14, 16, or blank columns, is selected as a function of the integer-type first scaling factor S1 of the first character segment 14 to achieve the desired number of lines or columns of the scaled character. To this end, there is also the optional possibility, given the presence of the two blank line segments 16, 18, or blank column segments, of scaling these blank segments using different scaling factors, and "filling up" the scaled character to the desired number of lines or columns. The second scaling factor may also be less than one, such that the blank lines or blank columns are deleted to obtain the desired scaling factor when viewing the complete character.

Figure 3A:
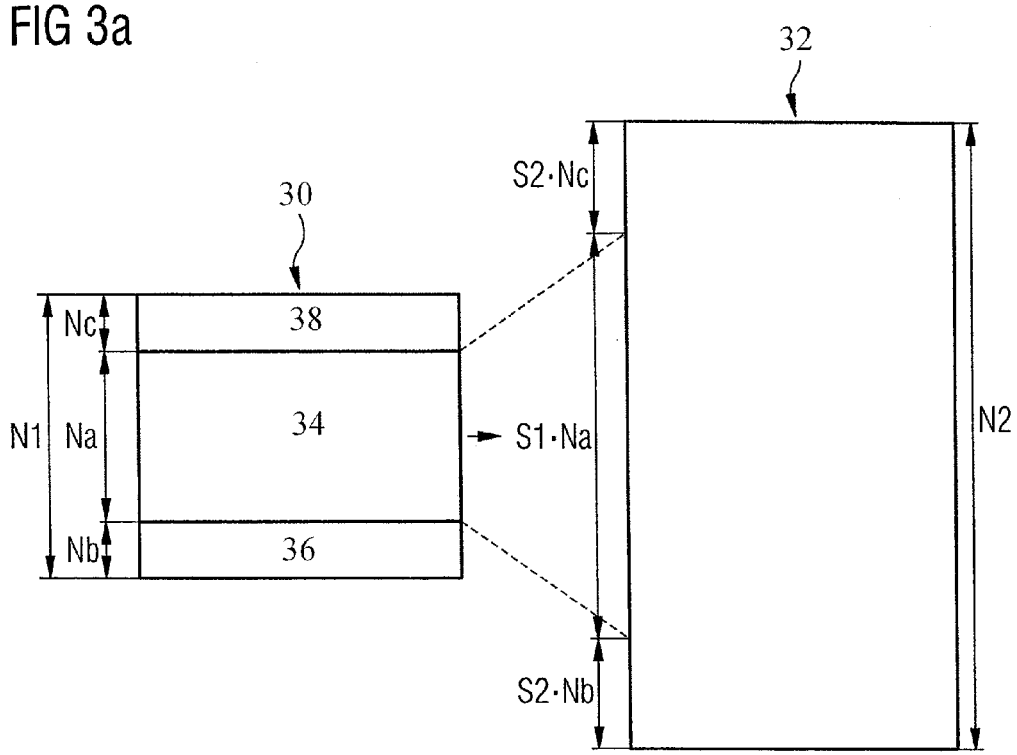
FIGS. 3A & 3B illustrate a technique for determining the scaling factors for individual character segments.
Figure 3B:
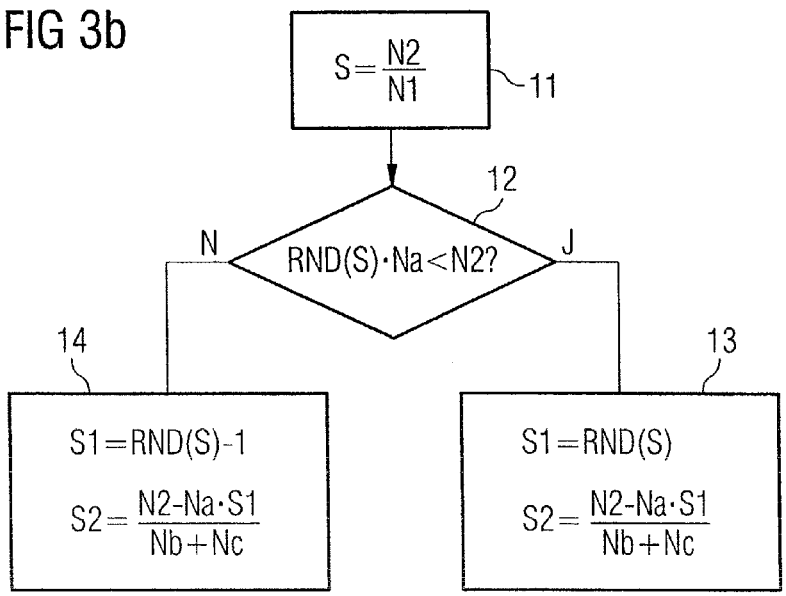

FIGS. 3A and 3B illustrate a procedure for determining the first and at least one second scaling factor S1, S2, to scale a character 30 to obtain a scaled character 32. What is assumed in the following description is a line scaling of the character 30. However, the following explanation can also be applied analogously to a column scaling of the character.

The character 30 to be scaled has N1 pixel lines and must be scaled to obtain the scaled character 32 having N2 pixel lines, where N2>N1. Before scaling, the character 30 to be scaled is divided into one first character segment 34, and, for example, two second character segments 36, 38. The number of pixel lines for the first character segment 34 is Na; the number for the first additional character segment 36 is Nb, while the number for second additional character segment 38 is Nc.

As set forth above, the overall scaling factor S is the the ratio of the line number N2 of the scaled character 32 and the line number N1 of the character 30 to be scaled. With reference to FIG. 3B, this overall scaling factor S is determined first in a first step 11, although it must be noted that this scaling factor can also be already provided in other ways.

In the case of a non-integer overall scaling factor S, the first integer-type first scaling factor S1 of the first character segment 34 (FIG. 3A) is selected as the next-higher integer value or next-lower integer value with reference to the non-integer scaling factor S. This first scaling factor S1 can be obtained, for example, by mathematically rounding the overall scaling factor S. However, it is important to ensure that the first scaling factor S1 is not so large that as a result of scaling the first character segment 34, a scaled character is obtained that has more lines than the specified line number N2 (FIG. 3A). For this reason, the step 11 (FIG. 3B) checks whether the product of the line number Na of first character segment 34 (FIG. 3A) and the rounded scaling factor is greater than or equal to the second line number N2. In the illustration of FIG. 3B, RND(.) stands for the above-mentioned rounding operation that mathematically rounds the scaling factor S to the next-higher or next-lower integer value. As long as the scaling of the first character segment 34 (FIG. 3A) by the rounded scaling factor S results in a scaled first character segment that has fewer than N2 lines, the rounded overall scaling factor S is used as the first scaling factor S1 in a step 13 (FIG. 3B). The second scaling factor S2 is then selected with the condition that S2·(Nb+Nc)=N2−Na·S1. This second scaling factor S2 cannot be an integer here.

If the comparison of step 12 (FIG. 3B) shows that the scaling of the first character segment 34 (FIG. 3A) by the rounded scaling factor results in a scaled first character region that has more than N2 lines, then the rounding value as the first scaling factor S1 is decremented by one in a step 14, and the decremented value is then used to determine the second scaling factor. The value of the second scaling factor S2 is chosen based on the above-explained condition.

FIG. 4 illustrates a table of first and second scaling factors S1, S2 which are required for character scaling to display "in a line-filling manner" a teletext page of twenty-five (25) lines on display devices having the resolutions indicated in the table. In order to expand the (25·10)=250 pixel lines of a standard teletext page on at least 480 pixel lines of the VGA resolution, an overall scaling factor of S equal to 1.9 can be used. If the individual teletext characters comprise, with reference to FIG. 3A, N1 equal to ten (10) pixel lines, the first scaling factor selected can be S1 equal to two (2). The scaling of the first character segment 34 (FIG. 3A) then results in a scaled first character segment having (S1·Na) equal to 16 pixel lines. The second scaling factor S2 of the second character segments, each of which comprises one blank line, is then mathematically (19−16)/2=1.5. Obtaining this scaling factor for the two mutually separated second character segments 36, 38 (FIG. 3A) can be achieved by scaling the one character segment using a scaling factor of two (2) and the other character segment using a scaling factor of one (1). For example, the blank lines at the lower end of the pixel matrix are doubled, while at the top end only one blank line is present in the scaled character.

An analogous scaling specification in the line direction results for the display of a teletext page on a WVGA display device that has a resolution of 480 lines of 848 pixels each.

To expand the 250 pixel lines of a standard teletext page on the 720 lines of an WXGA1 display device, the overall scaling factor S equals 2.8, whereas the first and second scaling factors are, 3 and 2, respectively. To achieve expansion for display on a UXGA or WUXGA display device with 1200 pixel lines, the overall scaling factor S is equal to 4.8, the first scaling factor S1 is equal to five (5), and the second scaling factor S2 is equal to four (4).

The following discussion examines the case in which the first character segment is to be scaled symmetrically by a first scaling factor less than one in order to achieve, together with an appropriately selected second scaling factor for the second character segment, the desired overall scaling. A symmetrical scaling of the first character segment by a first scaling factor less than one requires that the first character segment be divided into adjacent subsegments, each having the same number of character units, and that the same number of character units be deleted from each subsegment.

The scaled character 12 of FIG. 2 is examined as an example, where it is assumed that this character is to be scaled using an overall scaling factor of $2.8^{-1}=5/14$ in order to arrive at the "reduced" scaled character 10 (FIG. 2). The segment 20 (FIG. 2) comprising the character information forms the first character segment for this reductive scaling, while blank segments B2, C2 illustrated in FIG. 2 form the second character segments for this reductive scaling.

Referring to FIG. 2, scaling using an overall scaling factor of 5/14 is obtained in the example by scaling the first character segment 20 comprising 21 lines by a first scaling factor of 1/3, and scaling the second character segments by scaling factors of 1/2 for segment C2 and 2/5 for segment B2. To achieve symmetrical scaling of the first character segment, this character segment is divided into seven (7) adjacent subsegments A21-A27 comprising three (3) lines each, while two (2) lines of each subsegment are deleted. It is assumed here that those lines are deleted which are located at the same position in the respective subsegments.

To obtain symmetrical scaling of the first character segment using a first scaling factor $S=K/L$ smaller than one, where K and L are each integers, the general rule is that the first character segment must be divided completely into sub-blocks, each having L character units, where in each sub-block $L\cdot(1-K/L)$ character units must be deleted at the respective same positions. A symmetrical scaling using this scaling factor requires at least that the ratio of the line number of the character segment to be symmetrically scaled and L is an integer. Thus, for a scaling factor of, for example, 1/3, two (i.e., $3\cdot(1-1/3)$) character units must be deleted from sub-blocks having three character units each, while for a scaling factor of 2/3 only one (i.e., $3\cdot(1-2/3)$) character block must be deleted out of the sub-blocks having 3 character units each.

Scaling of the two blank segments B2, C2 (FIG. 2) by scaling factors 2/5 and 1/2 is asymmetrical since the blank segments B2, C2 cannot be divided into more than one sub-block with 2 or 5 lines.

As was explained using the example of FIG. 2, in the case of a scaling using an overall scaling factor smaller than one, the division of the character into the first and at least one second character segment is effected so that the first character segment is symmetrically scalable by a first scaling factor which is the reciprocal value of an integer.

Finally, it should be pointed out that for a desired scaling by an overall scaling factor greater than one, one of the two scaling factors can also be smaller than one, while for a desired scaling by an overall scaling factor less than one, one of the two scaling factors can also be greater than one.

Although the present invention has been illustrated and described with respect to several preferred embodiments thereof, various changes, omissions and additions to the form and detail thereof, may be made therein, without departing from the spirit and scope of the invention.

What is claimed is:

1. A method performed in a processer of scaling a graphic character defined by a character matrix with a number of character units that are indivisible at least in a horizontal direction or a vertical direction, the method performed in the processor comprising:
   dividing the character matrix into a first character segment and at least one second character segment, each character segment including at least one of the character units;
   symmetrically scaling the first character segment using a first scaling factor; and
   scaling within the processor the at least one second character segment using a second scaling factor different from the first scaling factor to provide a scaled character matrix, and filtering of the scaled character matrix to provide a filtered scaled character matrix.

2. The method of claim 1, where
   in a symmetrical scaling of the first character segment by a first scaling factor greater than one, the character units of the first segment are displayed repeatedly adjacently according to the value of the first scaling factor; and
   in a symmetrical scaling of the first character segment by a first scaling factor smaller than one, the first character segment is divided into at least two subsegments, each having the same number of character units, while the same number of character units is deleted from each character segment at the same respective positions of the subsegment.

3. The method of claim 2, where the character matrix has an information segment containing character information and a blank segment containing no character information, and is divided such that the first character segment comprises the information segment and the at least one second character segment comprises the blank segment.

4. The method of claim 3, where the at least one second character segment is selected such that it consists of one character unit.

5. The method of claim 2, where the character matrix is divided into one first character segment and two second character segments, the first character segment being located between the second character segments.

6. The method of claim 5, where the second character segments are selected such that they each comprise exactly one character unit.

7. The method of claim 5, where the second character segments are scaled using different second scaling factors.

8. The method of claim 1, where the first scaling factor is greater than one and is an integer.

9. The method of claim 1, where the first scaling factor is the reciprocal value of an integer.

10. The method of claim 1, where the character units are lines of the character matrix.

11. The method of claim 1, where the character units are columns of the character matrix.

12. The method of claim 1, where the character matrix comprises lines and columns, and where the lines and/or columns are scaled.

13. The method of claim 1, where the second scaling factor is an integer.

14. The method of claim 1, where the second scaling factor is a non-integer.

15. A method performed in a processor of scaling a graphic character defined by a character matrix with a number of character units that are indivisible at least in a horizontal direction or a vertical direction, the method performed in a processor comprising:
dividing the character matrix into a first character segment and at least one second character segment, each character segment including at least one of the character units;
symmetrically scaling the first character segment using a first scaling factor; and
scaling within the processor the at least one second character segment using a second scaling factor different from the first scaling factor, where the graphic character is a teletext character having a character matrix of 12 columns by 10 lines.

16. A method performed in a processor of scaling a graphic character defined by a character matrix having a number of character units, the method performed in a processor comprising the steps of:
dividing the character matrix into a first character segment and at least one second character segment, each character segment including at least one character unit;
scaling the first character segment using a first scaling factor;
scaling within the processor the at least one second character segment using a second scaling factor to provide a rescaled character matrix that includes rescaled first and second character segments; and
filtering the rescaled character matrix to provide a filtered rescaled character matrix.

17. The method of claim 16, where the first and second scaling factors are different.

18. The method of claim 16, where the character units comprise lines of the character matrix.

19. The method of claim 16, where the character units comprise columns of the character matrix.

* * * * *

UNITED STATES PATENT AND TRADEMARK OFFICE
CERTIFICATE OF CORRECTION

PATENT NO. : 7,532,216 B2  Page 1 of 1
APPLICATION NO. : 11/297123
DATED : May 12, 2009
INVENTOR(S) : Wendel et al.

It is certified that error appears in the above-identified patent and that said Letters Patent is hereby corrected as shown below:

Column 8
Line 7, delete "processer" and insert --processor--

Signed and Sealed this

Twenty-third Day of June, 2009

JOHN DOLL
*Acting Director of the United States Patent and Trademark Office*